March 2, 1926.
H. H. DOEHLER ET AL
1,574,874
VEHICLE BODY
Filed March 6, 1923 2 Sheets-Sheet 2
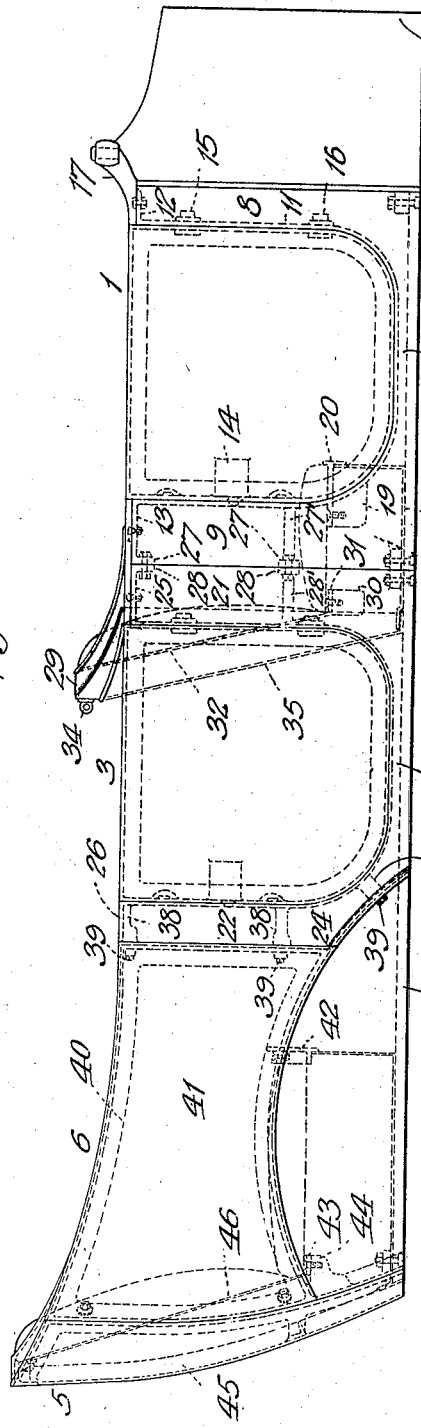
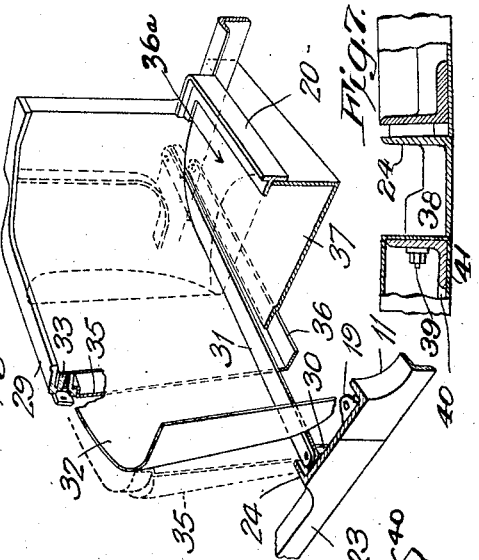
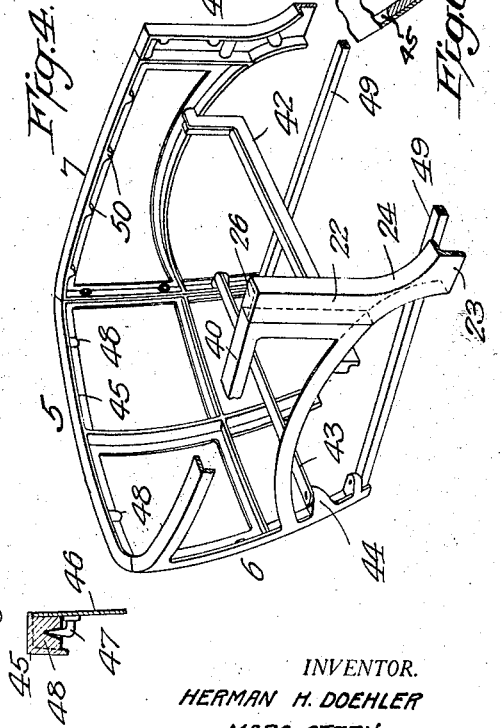
INVENTOR.
HERMAN H. DOEHLER
MARC STERN
BY
Stockbridge Borst
ATTORNEYS Patented Mar. 2, 1926.

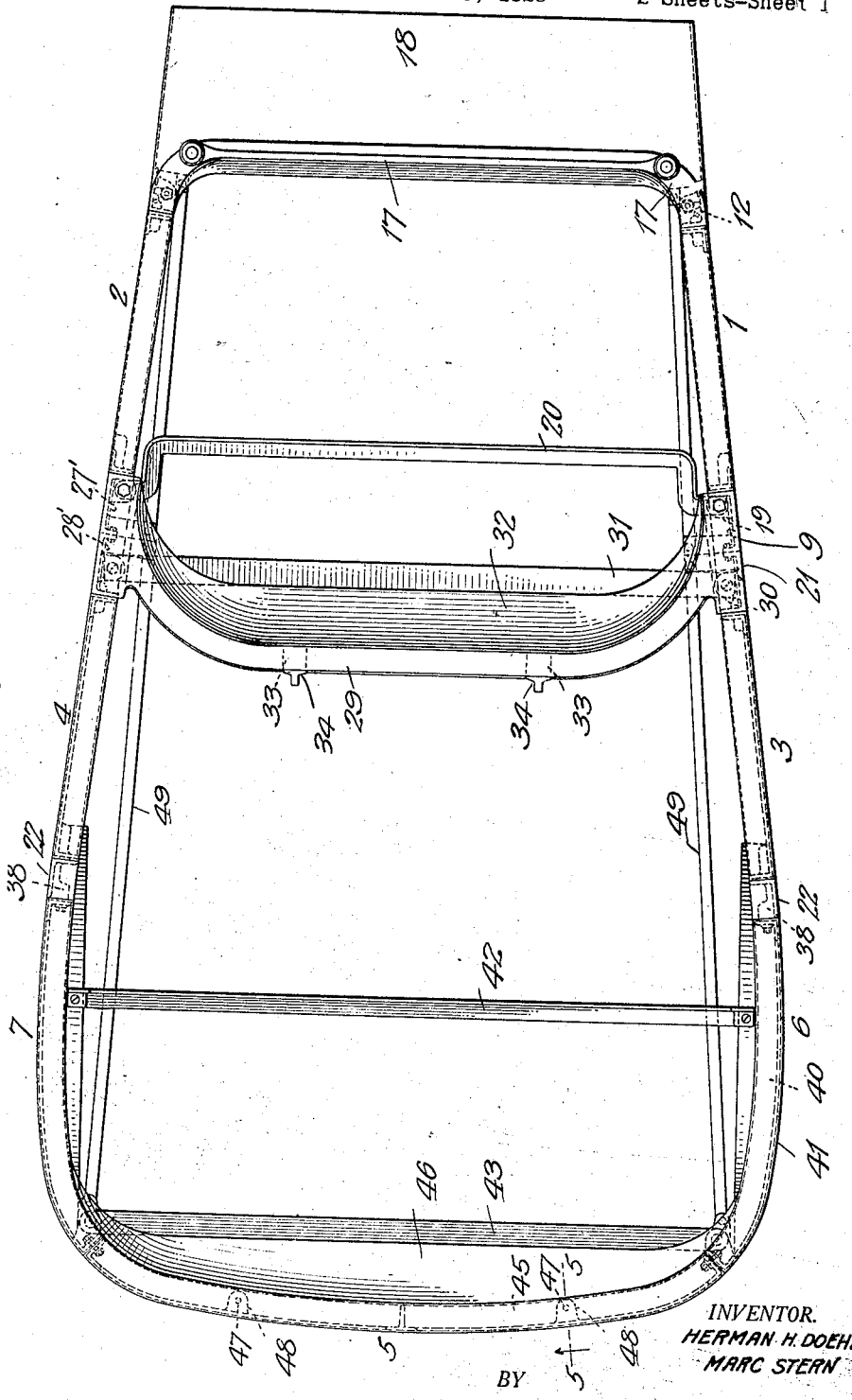

1,574,874

UNITED STATES PATENT OFFICE.

HERMAN H. DOEHLER, OF NEW ROCHELLE, AND MARC STERN, OF BROOKLYN, NEW YORK, ASSIGNORS TO DOEHLER DIE-CASTING CO., A CORPORATION OF NEW YORK, N. Y.

VEHICLE BODY.

Application filed March 6, 1923. Serial No. 623,117.

*To all whom it may concern:*

Be it known that we, HERMAN H. DOEHLER and MARC STERN, citizens of the United States, residing at New Rochelle, county of Westchester, and State of New York, and borough of Brooklyn, county of Kings, and State of New York, respectively, have invented certain new and useful Improvements in Vehicle Bodies, of which the following is a full, clear, and exact description.

Our invention relates especially to automobile bodies, and the chief object of our invention is to produce an all-metal body which will be light and at the same time will be sturdy, and easy and relatively cheap to manufacture. A more particular object is to provide a body which may be made largely by die-casting from aluminum or aluminum alloy. Our invention has other objects with reference to details of construction as will be developed in the particular description.

The advantages of all-metal bodies is appreciated in the trade, one of which is the fact that such bodies may be subjected to considerably higher temperature in baking a coating of enamel thereon, than is the case where some of the body construction is composed of wood. All-metal bodies have been heretofore produced, but, so far as we are aware, they have been composed largely or entirely of steel and have therefore been extremely heavy as well as expensive.

In accordance with our invention we produce a body almost entirely of aluminum or aluminum alloy, and in such a way that it lends itself readily to the die-casting method. The body which our invention contemplates is a sectional body, the different sections being separately made and joined together end to end to form the complete body. There are on each side one or two door-framing sections, depending upon whether the body has one or two seats, the sheet metal cowl being secured to the front end of these sections and to a cowl bar which is also secured at its ends to the tops of the front panels of the sections. These door-framing sections are die-cast in one piece, the panels being channel or angle pieces to provide a smooth outer face and flanges for the door seat and for attachment to adjacent sections.

The rear part of the body back of the doors is composed of a plurality of sections which have die-cast frames the component members of which are angle pieces to provide the necessary width to the top edge and flanges for securing to adjacent sections. These frames are covered with sections of sheathing which preferably have their ends secured in between the abutting ends of the frames. This portion of the body is preferably made of three sections, one rear section extending the full width of the back, and two side sections joining the rear ends of the door-framing sections. These side sections are properly shaped to provide the usual space for the rear wheels and a shoulder for attachment of the mudguards.

Our invention also comprehends various other features of construction as will appear from the following description. We shall now describe the illustrated embodiment of our invention and shall thereafter point out our invention in claims.

Fig. 1 is a plan of a complete body embodying our invention.

Fig. 2 is a side elevation of the same.

Fig. 3 is a perspective of a portion of the body including the front seat.

Fig. 4 is a perspective of the assembled frames for the rear portion of the body.

Fig. 5 is a sectional detail through the top piece of the rear frame on line 5—5 of Figure 1.

Fig. 6 is a fragmentary sectional detail through the joint between the rear section and one of the side sections of the rear seat portion of the body;

Fig. 7 is a similar detail through a joint between one of the rear door-framing sections and the adjacent side section of the rear seat portions.

The illustrated body has two seats and four doors, and while it is shown and will be described as of the open body type, it will readily be understood that panels of the same or similar construction may be superimposed upon those shown to make it a closed body. The body shown is composed of seven sections, of which there are two front door-framing sections 1 and 2, two rear door-framing sections 3 and 4, and the back seat body portion consisting of the rear section 5 and the two side sections 6 and 7. Each door-framing section is cast all in one piece. As shown, these sections 1, 2, 3 and 4 are composed of relatively narrow panels on each side of the door connected by a rounded bottom, being substantially U-shape in elevation, and they have an inwardly extending flange around the door-opening and along the top edges of their panels. The doors may be made in any suitable way, and may, if desired be die-cast according to the disclosures of our copending application Serial No. 610,422, filed January 3, 1923.

Referring to the door-framing section 1, it will be seen that this is composed of a front panel 8 and a rear panel 9 joined at their bottom by a connecting portion 10 below the door, and that the cross section of these panels and connecting portion shows them to be angular in shape due to the fact that a flange 11 extends inwardly from the inner periphery of this section forming the seat to the door, while the bottom portion of this flange may also serve as the threshold or scuff. On the top edge of each panel of the section is an inwardly extending flange corresponding to the width of the door, the flange on the panel 8 being numbered 12, and that on the panel 9 being numbered 13. The strike for the lock 14 on the door may be secured to this flange and the hinge sockets 15 and 16 may be seated in recesses provided in this flange.

The door-framing section 2 is the reverse of the section 1, being otherwise in all respects a duplicate thereof. A cowl bar 17 of the usual shape extends across the front of the body and is secured at its ends to the flange 12 of the panel 8 and to the corresponding flange of the front panel of the section 2. The arch-shape sheet metal cowl 18 underlaps the front edges of the panel 8 and of the corresponding panel of the section 2 and is secured to these panels and to the cowl bar 17 in any suitable way, as by welding.

At the proper height from the bottom of the body, the panel 9 is provided on its inner face adjacent its inner periphery with an integral flat topped boss 19, and the corresponding panel of the section 2 is provided on its inner face with a similar boss (not shown). A seat-supporting transverse bar 20 is secured at its ends to these two bosses. This bar 20 is shown as T-shape in cross section and its longitudinal outline corresponds to the shape of the front edge of the front seat cushion.

The rear door-framing section 3 is substantially the same shape as the section 1, having the front panel 21 and the rear panel 22 joined at their bottom by the connecting portion 23. An inwardly extending flange 24 runs around the door opening, and the panel 21 has an inturned flange 25 at its top edge, while the panel 22 has a similar top flange 26. The front edge of this section 3 is straight and abuts against the rear edge of the section 1. To attach these two sections together, the section 9 is shown as provided with projections or fastening lugs 27 on its inner face along the rear edge while the panel 21 of the section 3 has corresponding projections or lugs 28 along its front edge arranged to register with the lugs 27, and these lugs are bolted together. Strengthening ribs 27' and 28' are shown on the inner face of the panels 9 and 21, respectively joining with the lugs 27 and 28. If desired it is evident that a continuous flange may be employed along these abutting edges instead of the spaced lugs.

The door-framing section 4 is the reverse of the section 3, but is otherwise a duplicate thereof and is similarly secured to the section 2. A front seat top bar 29 extends across the body and is secured at its ends to the flanges 13 and 25 on the one end, and to the corresponding flanges on the other end. This top bar is shown as angular in cross section, being rearwardly bowed in the usual shape and merging at its ends into the flat attaching portion.

The front panel 21 of the section 3 has integral with its inner face, a seat supporting boss 30 of substantially the same height as the boss 19. The corresponding panel of the section 4 has a similar boss (not shown) correspondingly disposed on its inner face, and a flat bar 31 is secured at its ends to these two bosses. This bar serves as the support for the back side of the front seat cushion, being on substantially the level of the bar 20.

A sheet metal panel 32 for the upright or back cushion of the front seat is secured at its upper edge to the top bar 29 and with its lower edge to the bosses 19 and 30 on one end and to the corresponding bosses on the other end. In the construction shown, the bar 29 has two lugs 33 formed on the front face of the back flange, and screws pass through these lugs 33 from the rear face of the bar 29 and engage in the cushion supporting panel 32. Robe rod brackets 34 are secured to the back face of the bar 29 over the rear ends of the screws in the lugs 33, thus finishing the appearance of the bar, as well as serving to hold the screws in place. The panel 32 rests with the bottom edge on the bar 31 and is secured by outturned ears to the boss 30 and to the corresponding boss on the other side, while the ends which are curved forwardly, are provided on their bottom with similar fastening ears by means of which they are secured to the boss 19 on the one side and to the corresponding boss on the other side.

A sheet metal back 35 for the front seat is welded or otherwise secured along its top edge to the inner face of the bar 29, its top edge being shouldered or set in to make a flush finish with the outer face of the bar. This sheet metal back 35 is curved to the outline of the bar 29 and has its bottom edge bent forwardly to the plane of the bottom of the car, forming a flange 36. The bottom part of this member 35 forms the back of the tool box 36ª under the front seat, and the bottom and front of this tool box are formed by a sheet metal member 37, which has a bottom portion and an upright front portion, the top edge of which is welded or otherwise secured to the inner face of the bar 20; while the bottom portion extends back and overlaps the flange 36 of the member 35, being welded or otherwise suitably secured thereto.

The panel 22 of the section 3 and corresponding panel of the section 4 have transverse ribs 38 formed on their inner faces with bolts 39 cast therein as inserts. These serve as means to attach these sections to the sections immediately in the rear thereof, although it will be understood that a continuous flange might be formed along these rear edges for this purpose.

The sections 5, 6 and 7 are composed of metallic frames cast in one piece and covered with sections of sheet metal sheathing. The sections 6 and 7 are in all respects duplicates, except that they are the reverse of one another. The frame 40 for the section 6 is a skeleton or outlining frame member, the component elements of which are angle pieces, being flat along the face of the body and having an inwardly turned flange around its outer periphery. The rear leg of the frame extends below the bottom member of the frame, this bottom member being upwardly curved to the shape of the mudguard, while the rear corner of the door-framing section 3 is also inwardly curved to a continuation of that of the lower member of the frame 40. Covering the outer face of this frame 40 is a suitable section of metal sheathing 41 which has its top edge bent over the flange along the top of the frame and is then turned underneath this flange at the inner edge thereof. The ends of the sheathing section 41 are turned around the ends of the frame, at the forward end of the section being secured in between the lugs 38 and the flange along the upright of the frame 40. The bolts 39 are shown as going through this turned-in edge, as well as through the flange of the frame member, but it will be understood that other means for fastening may be employed such as welding.

Underneath the upwardly curved bottom member of the frame 40, the sheathing 41 is folded or bent inwardly and is then continued down to provide the usual wheel space and overhanging shoulder for the attachment of the mudguard. This sheathing has a continuation at its front lower corner which is folded underneath the rounded corner of the door-framing section 3, where it is secured by a nut on a bolt 39 which is also cast as an insert in a rib 38 at that point. This bolt passes through the sheathing, which is clamped in place by the nut on the under side of the inwardly folded portion of the sheathing underneath the corner of the door.

To support the rear seat, two seat bars 42 and 43 extend between the two frames of the sections 6 and 7. The bar 42 for the front edge of the seat is T-shape in cross section and is secured at its ends to the upwardly rounded bottom member of the frames, the transverse portion being dropped down below its ends to bring the seat at the proper level. The bar 43 is attached at its one end to a boss 44 on the rear upright of the frame 40 where it is extended below the curved bottom member, and the bar is attached at its other end to a corresponding boss on the frame of the section 7.

A tool box, indicated by dotted lines in Fig. 2, is shown as provided underneath the rear seat, being secured at its front end to the front bar 42 and at its rear end to the rear bar 43.

The frame 45 of the rear section 5 completes the back of the car and is joined at its ends to the sections 6 and 7. This member has an inwardly extending peripheral flange, and this flange on the uprights abuts against the flange on the uprights of the adjacent sections, the sections being clamped together in the constructions shown by bolts which pass through them. This rear frame 45 is also covered with a suitable section of sheet metal sheathing, the top edge of which is folded over the top flange, while its ends are turned in and secured between the abutting flanges. This frame 45 is shown as having a central upright rib.

The upright panel 46 for the rear seat back cushion is shown as a sheet metal member having two upwardly directed, pointed hooks 47 secured on its outer face near its top edge. Sockets for these hooks are formed in bosses 48 on the under side of the top member of the frame 45. This panel 46 is secured in place by inserting these hooks 47 in their sockets, the panel being so proportioned that its lower edge rests upon the cross bar 43. The ends of this panel 46 are curved forwardly to conform to the usual rounded corners which the frame has, and it has ears at its bottom edge, similar to the ears on the panel 32, through which the screws pass to secure this member to the boss 44 on the one end and to the corresponding boss on the other end.

To brace the body two steel bars 49 may be secured underneath the body along its opposite sides. These bars will be on the line with the chassis. They are shown as secured at their rear ends to the frame members 40 and at their front ends to bosses formed on the inner faces of the front panels of the door-framing sections 1 and 2.

Intermediate of their ends, they are secured to bosses formed on the inner face of the rear panels of the sections 1 and 2 and of the front panels of the sections 3 and 4. The bottom flanged edge 36 of the sheet metal back 35 of the front seat may be bolted to these bars 49, as shown.

The upholstery may be attached to the inside of the body in any suitable way, as for example, by screws to lugs 50 which are formed around the entire frame integral with the peripheral flanges of the frame members. For simplicity of illustration only a few of these lugs 50 are shown.

It is obvious that various modifications may be made in the construction shown in the drawings and above particularly described within the principle and scope of our invention.

We claim:

1. A sectional metallic vehicle body including on each side an integral cast metallic door-framing section which comprises a front and rear panel and a connecting portion joining their bottoms and having an inwardly extending flange around the door opening formed by the two panels and the connecting portion and means on the rear edge of the rear panel for attachment to an adjacent section.

2. A vehicle body comprising a metallic door-framing section cast in one piece and having on its inner face at its rear edge an integral projection, a skeleton metallic frame cast in one piece arranged with its front edge abutting and secured to the rear edge of the said section and having an inward projection at its front edge registering with that of said section, and a section of metallic sheathing covering the frame and having its front end turned in and secured between the two abutting edges.

3. A vehicle body comprising a plurality of sections secured end to end, each section including a metallic skeleton frame cast in one piece and having an inwardly projecting flange along the abutting edges, and a section of metallic sheathing covering each frame and having its ends turned in and secured between the abutting flanges of the frames.

4. In a vehicle body, the combination of an integral cast metallic door-framing section having a plurality of spaced ribs on its inner face and having its rear lower corner concavely rounded, and a side section including a metallic skeleton frame cast in one piece and having an inwardly extending flange around its outer periphery, the bottom piece being upwardly curved to a continuation of the corner of the door-framing section, the two sections being arranged with their edges abutting and secured together, and a metallic sheathing covering the skeleton frame having its front end turned in and secured between the abutting edges.

5. In a vehicle body, the combination of an integral cast metallic door-framing section having a plurality of spaced ribs on its inner face and having its rear lower corner concavely rounded, and a side section including a metallic skeleton frame cast in one piece and having an inwardly extending flange around its outer periphery, the bottom piece being upwardly curved to a continuation of the corner of the door-framing section, the two sections being arranged with their edges abutting and secured together, a metallic sheathing covering the skeleton frame and having its front end turned in between the abutting edges and having its bottom portion underneath the said bottom piece set in to provide wheel space and a shoulder for the attachment of a mudguard, and fastening means attaching said ribs and flange at the abutting edges.

6. In a vehicle body, the combination of an integral cast metallic door-framing section having a plurality of spaced ribs on its inner face and having its rear lower corner concavely rounded, and a side section including a metallic skeleton frame cast in one piece and having an inwardly extending flange around its outer periphery, the bottom piece being upwardly curved to a continuation of the corner of the door-framing section, the two sections being arranged with their edges abutting and secured together, a metallic sheathing covering the skeleton frame and having its front end turned in between the abutting edges and having its bottom portion underneath the said bottom piece set in to provide wheel space and a shoulder for the attachment of a mudguard, and continued forward and folded underneath the rounded corner of the door-framing section, means for securing the sheathing to a rib at the said corner, and means for securing the said ribs and flange at the abutting edges with the end of the sheathing interposed.

7. In a vehicle body, a rear seat portion comprising a back section and two side sections joined end to end, each section comprising a metallic skeleton frame cast in one piece, a metallic sheathing covering the outer face of the frame and having its ends turned in and interposed between the abutting ends of the frames, and means securing the said abutting frame ends and the interposed ends of the sheathing together.

8. In a vehicle body, a rear seat portion comprising a back section and two side sections joined end to end, each section comprising a metallic skeleton frame cast in one piece and having an inturned flange along the top and each abutting end, a metallic sheathing covering each frame and having its ends turned in so that two sheathing ends are gripped between each of the two pairs of abutting ends, and means securing together each pair of abutting ends with the two interposed sheathing ends.

9. In a vehicle body, a rear seat portion comprising a back section and two side sections joined end to end, each section comprising a metallic skeleton frame cast in one piece and the sections being composed of angle members along their tops and abutting ends and the bottom members of the side frames being curved upwardly to the outline of a mudguard, a metallic sheathing section covering each side frame and turned in and set back underneath the curved bottom member thereof to provide a wheel space and a shoulder for the attachment of a mudguard, and a metallic sheathing section covering the back frame, the ends of the sheathing sections being turned in and gripped between the abutting frame ends.

10. A sectional vehicle body comprising two door-framing sections and a rear seat portion composed of a plurality of rear sections joined end to end, the rear sections having each a metallic frame cast in one piece and a sheet metal covering with its ends turned in and secured between the abutting frame ends, and the door-framing sections being metallic and cast integral in one piece and joining with the respective front ends of the body portion composed of the rear sections.

11. A sectional vehicle body having front and rear seats and four doors comprising on each side two door-framing sections joined end to end and three rear sections joined end to end and to the rear ends of the rear door-framing sections, the door-framing sections being metallic and cast in one piece and flanged inwardly around the door opening, and the rear sections having each a metallic frame cast in one piece and a sheet metal covering with its ends turned in and secured between the abutting section ends.

12. A sectional vehicle body having front and rear seats and four doors comprising on each side two door-framing sections joined end to end and three rear sections joined end to end and to the rear ends of the rear door-framing sections, the door-framing sections being metallic and cast in one piece and flanged inwardly around the door opening, and the rear sections having each a metallic frame cast in one piece and a sheet metal covering with its ends turned in and secured between the abutting section ends and a longitudinally extending brace bar disposed underneath each side of the body and secured at its rear end to one of the rear sections and at its front end to the front door-framing section.

13. A vehicle body comprising a front door-framing section on each side of the body which is composed of metal and cast in one piece and has a panel portion on each side of the door opening and a bottom connecting portion, and an inward flange around the door opening, a cowl bar extending across the front of the body and secured at its ends to the front panel portions of the door-framing sections, and a sheet metal cowl underlapping the front edges of the two door-framing sections and secured thereto and to the cowl bar.

14. A sectional vehicle body comprising on each side two door-framing sections secured end to end, each section being composed of metal and cast in one piece and having an inward flange along the top of its panels and around the door opening and the two front sections having each a seat supporting boss on the inside face of the rear panel and the two rear sections having each a seat supporting boss on the inside face of the front panel.

15. A sectional vehicle body comprising on each side two door-framing sections secured end to end, each section being composed of metal and cast in one piece and having an inward flange along the top of its panels and around the door opening and the two front sections having each a seat supporting boss on the inside face of the rear panel and the two rear sections having each a seat supporting boss on the inside face of the front panel, a front seat top bar spanning the body and secured at its ends to the tops of the adjacent panels of the respective door-framing sections, and a front seat upright cushion panel secured at its top to the said bar and at its bottom to certain of the said seat supporting bosses.

16. A sectional vehicle body comprising on each side two door-framing sections secured end to end, each section being composed of metal and cast in one piece and having an inward flange along the top of its panels and around the door opening and the two front sections having each a seat supporting boss on the inside face of the rear panel and the two rear sections having each a seat supporting boss on the inside face of the front panel, a front seat top bar spanning the body and secured at its ends to the tops of the adjacent panels and the respective door-framing sections, a front seat upright cushion panel having its top edge overlying the front face of the said bar, screws passing through said bar from rear to front and securing the said cushion panel to said bar, and robe-rod brackets secured to the rear face of said bar over said screw ends.

17. A sectional vehicle body comprising on each side two door-framing sections secured end to end, each section being composed of metal and cast in one piece and having an inward flange along the top of its panels and around the door-opening and the two front sections having each a seat supporting boss on the inside face of the rear panel and the two rear sections having each a seat supporting boss on the inside face of the front panel, a front seat top bar spanning the body and secured at its ends to the tops of the adjacent panels of the respective door-framing sections, a transverse bar attached to the two said front bosses, a second transverse bar attached to the two said rear bosses, the two transverse bars serving to support the front seat, a sheet metal back for the front seat secured at its top to the front seat top bar and extending down to the bottom of the body and having its lower edge turned forward, and a sheet metal bottom for a tool box lapping the said lower edge of the seat back and turned up at its front edge and secured to the said transverse bar.

18. In a sectional vehicle body, a rear seat portion comprising a rear section and two side sections joined end to end, each section being composed of a metallic skeleton frame cast in one piece and a metallic sheathing section covering the frame, the side frames having their rear upright pieces extended below the bottom piece and having an integral boss on the said extension, a transverse seat bar secured at its ends to the said bosses, and a second transverse seat bar secured at its ends to the bottom pieces of the side frames.

19. In a sectional vehicle body, a rear seat portion comprising a rear section and two side sections joined end to end, each section being composed of a metallic skeleton frame cast in one piece and a metallic sheathing section covering the frame, the side frames having their rear upright pieces extended below the bottom piece and having an integral boss on the said extension, a transverse seat bar secured at its ends to the said bosses, and a second transverse seat bar secured at its ends to the bottom pieces of the side frames and a tool box under said seat bars and secured at its front to the front bar and at its rear to the rear bar.

20. In a sectional vehicle body, a rear seat portion comprising a rear section and two side sections joined end to end, each section being composed of a metallic skeleton frame cast in one piece and a metallic sheathing section covering the frame, the top piece of the rear section frame having a socket formed in its under face, and an upright panel for the back seat cushion supported at its bottom by the said frames and having a hook on its inner face adjacent its top edge engaging in the said socket.

21. In a sectional vehicle body, a rear seat portion comprising a rear section and two side sections joined end to end, each section being composed of a metallic skeleton frame cast in one piece and a metallic sheathing section covering the frame, two transverse bars secured at their ends to the side section frames and adapted to support the back seat, the top piece of the rear section frame having a socket formed in its under face, and an upright panel for the back seat cushion supported at its bottom by the rear one of said transverse bars and having a hook on its inner face adjacent its top edge engaging in the said socket.

In witness whereof we hereunto subscribe our signatures.

HERMAN H. DOEHLER.
MARC STERN.